CARDIAC AMPLIFIER SYSTEM WITH FAST SWITCHING

Filed Jan. 11, 1967

INVENTOR.
LESLIE W. PARTRIDGE

By MASON, KOLEMAINEN, RATHBURN & WYSS

Attys.

United States Patent Office 3,477,421

Patented Nov. 11, 1969

3,477,421
CARDIAC AMPLIFIER SYSTEM WITH FAST SWITCHING

Leslie W. Partridge, Janesville, Wis., assignor to The Burdick Corporation, Milton, Wis., a corporation of Delaware Filed Jan. 11, 1967, Ser. No. 608,546
Int. Cl. A61b *5/04;* H01f *7/08*
U.S. Cl. 128—2.06 2 Claims

ABSTRACT OF THE DISCLOSURE

A cardiac amplifier system with several patient electrodes includes a push-pull amplifier with a capacitor-coupled input and a switch for selecting different input combinations. A pair of transistors short circuit the amplifier input and the coupling capacitors when the selector switch is operated to prevent application of undesirable transients to the amplifier, and to allow the capacitors to discharge. The transistors are controlled by a non-shorting wiper of the selector switch engageable with fixed contacts to which a control voltage is applied.

Figures 1, 2:
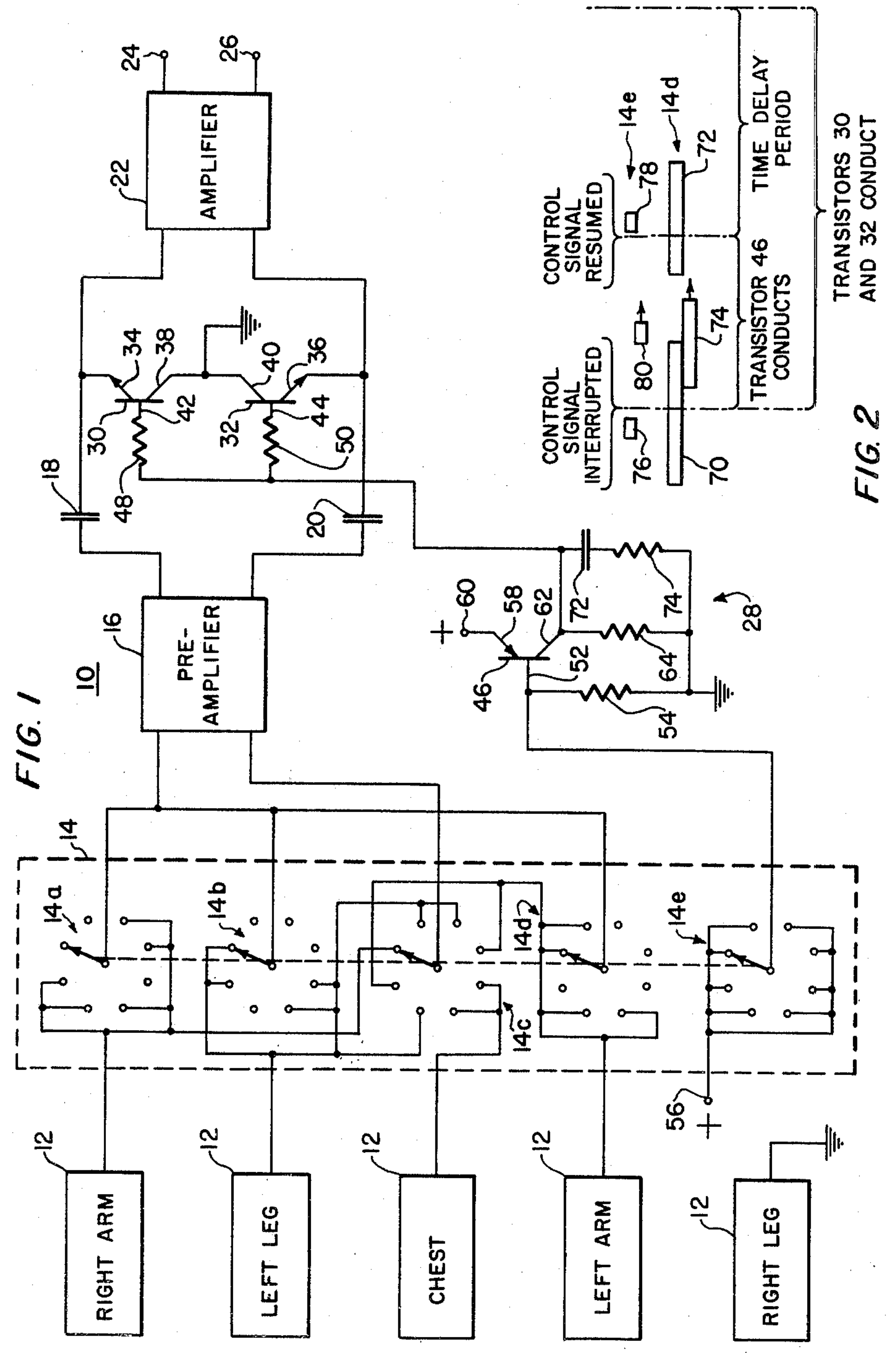

The present invention relates to cardiac amplifier systems and more particularly to a cardiac amplifier with an improved arrangement for fast switching between patient lead combinations. Such amplifier systems can be used in electrocardiographs, heart monitoring systems, etc.

In U.S. Patent No. 2,865,366 there is disclosed and claimed in electrocardiograph including several patient electrodes, a lead selector switch for extending connections to different ones of the electrodes, a push-pull amplifier stage, and coupling condensers for applying the selected cardiac signal to the amplifier stage. As explained in that patent, operation of the selector switch introduces undesirable transients due to switching, and due to the differing skin potentials encountered by the different patient electrodes. These transients can make it impossible to obtain an accurate record for some time after switching, and can overdrive and possibly damage the amplifying and recording equipment.

To avoid these problems, the above indentified patent discloses an arrangement for shorting the amplifier input and coupling condensers during switching. This arrangement includes a relay controlled by muting contacts on the selector switch for shorting the condenser and the amplifier input for a brief interval upon switching. U.S. Patent No. 2,841,663 discloses and claims a switch suitable for this relay controlling function. This system allows fast switching between patient electrodes by discharging the coupling condensers during switching and preventing the coupling condensers from applying transient signals to the amplifier during switching and by allowing the coupling condensers rapidly to reach a new steady-state condition after switching.

The prior art apparatus referred to above has performed extremely well, and has been widely used commercially. The present invention provides an improved arrangement in which relays or other moving parts are not required, and wherein microphonically induced signal distortions are avoided; in which the speed of operation is increased; in which the operation is little affected by such conditions as humidity, dust, etc; in which the life of the components is increased; and in which an expensive muting type switch is not required.

In brief, a cardiac amplifier system embodying the features of the present invention may comprise a plurality of patient electrodes and a selector switch movable to different positions for extending connections to different ones of the patient electrodes. An amplifier is coupled to the selected electrodes by means including a coupling condenser. In accordance with an important feature of the present invention, a controlled conduction device is coupled to the coupling condenser and to the amplifier, and is controlled in response to operation of the selector switch to prevent the application of undesirable transients to the amplifier.

Many objects and advantages of the present invention will appear from the following detailed description of an illustrated embodiment of the invention. In the course of this description, reference is had to the accompanying drawing, wherein:

FIG. 1 is a schematic and partly diagrammatic representation of a cardiac amplifier system constructed in accordance with the features of the present invention; and FIG. 2 is a diagrammatic representation of portions of the lead selector switch illustrating the sequence of events occurring when the lead selector switch is operated.

Referring now to the drawing, and initially to FIG. 1, there is illustrated a cardiac amplifier system designated as a whole by the numeral 10 and embodying the features of the present invention. The system 10 includes five patient electrodes 12, one for each arm and leg and one for the chest of a patient, as labeled on the drawing. One of the patient electrodes is grounded and the others are connected to a lead selector switch generally designated as 14. Input signals from the lead selector switch 14 are preamplified in a preamplifier 16 and are coupled through a pair of coupling condensers 18 and 20 to an amplifier 22.

Cardiac signals from the amplifier 22 appear at a pair of output terminals 24 and 26 and may be used for producing an electrocardiograph record, for other types of monitoring, or the like.

The lead selector switch 14 is operable to a number of different positions for changing the input connections to the amplifier 22 as will readily be understood by those skilled in the art. During switching, undesirable transients can be coupled through the condensers 18 and 20 to the amplifier 22, and as a result, the accuracy of the signal provided at the output terminals 24 and 26 is disturbed for a period of time. In addition, the transients, if large enough, may be harmful as by mechanically overdriving an electrocardiograph or other equipment connected to the output terminals 24 and 26.

In accordance with an important feature of the invention, the system 10 includes a novel circuit arrangement generally designated as 28 operable in response to operation of the lead selector switch 14 for discharging the capacitors 18 and 20, for short circuiting the input to the amplifier 22, and for allowing the capacitors 18 and 20 rapidly to reach a new quiescent charge level.

More specifically, the patient electrodes 12 may be of any conventional construction and may be connected to the remainder of the apparatus through a plug and socket type of receptacle, not shown. The right leg electrode is connected to ground, and the other electrodes are connected to the lead selector switch 14. With respect to these other four electrodes, it may be desirable to interpose a suitable isolating circuit between the electrode and the switch. Such a circuit is particularly important in those positions of the switch in which so-called augmented or so-called V connections are made because in these connections two or more electrodes are coupled in common to one input terminal of the pre-amplifier.

The selector switch 14 is effective to change the input connections to the amplifier stage 22, and includes five sections designated as **14*a*, 14*b*, 14*c*, 14*d*, and 14*e*. Each section includes a movable switch contact or wiper contact engageable with any one of a plurality of fixed contacts. In addition, the movable contacts of each section of the switch are ganged together for simultaneous operation as indicated on the drawing. For example, the lead selector switch 14** may comprise a rotary switch of the type including several wafer elements mounted along an operating shaft.

The fixed contacts of the switch sections 14*a*, 14*b*, 14*c*, and 14*d* are selectively connected to different ones of the patient electrodes 12 for the right arm, left leg, chest and left arm. The different positions of the lead selector switch 14 are effective to provide different types of input connections to the amplifier 22. In one type of connection, one patient electrode is connected to each side of the push-pull preamplifier 16. In the so-called augmented connections (one of which is illustrated in FIG. 1), two of the patient electrodes are connected together and these interconnected electrodes are connected to one side of the preamplifier input, the other side of the preamplifier being connected to a single electrode. In a third, so-called V connection, three electrodes are connected to one side of the preamplifier and the other side of the preamplifier is connected to the chest electrode.

The preamplifier 16 may be of any desired conventional construction and may include one or more stages of amplification including either transistors or vacuum tubes. The preamplifier 16 is of the push-pull type, and includes one input connected to the wiper contact of the switch section 14*c* and another input connected in common to the wiper contacts of the switch sections 14*a*, 14*b* and 14*d*.

The amplifier 22 may also be of any desired conventional construction and may comprise a push-pull DC amplifier including one or more transistor or vacuum tube amplifying stages. The two input leads of the amplifier 22 are coupled to the output of the preamplifier 16 by the coupling condensers 18 and 20.

Each patient electrode 12 develops a "skin potential" by interaction with the patient's body, the magnitude of which depends upon the electrode construction, skin condition, electrolyte material or pad used with the electrode, and upon other factors, and it is normal for the skin potential at different electrodes to differ widely. Thus in each position of the selector switch 14, certain quiescent charges are imposed across the condensers 18 and 20, this charge depending to some extent upon the skin potential of the electrodes to which connections are extended by the lead selector switch 14. When the lead selector switch 14 is moved between positions to change the input connections, it is necessary for the charge on the coupling condensers 18 and 20 to reach a new steady state level before an accurate record is provided at the output terminals 24 and 26.

In addition to the transients caused by the variations in skin potential experienced by the electrodes 12, other undesirable transients are introduced in switching. These transients, if coupled to the amplifier 22 through the coupling condensers 18 and 20, can interfere with the output signal, and in some instances, if large enough, can damage components of the amplifier and of the recording or monitoring equipment connected to the output terminals 24 and 26.

In order to allow the coupling condensers 18 and 20 rapidly to reach their steady-state charge condition upon switching, and in order to prevent the application of undesirable transients to the amplifier 22, the novel circuit arrangement 28 of the present invention is provided. Thus there are provided a pair of transistors 30 and 32 coupled to the coupling condensers 18 and 20 and to the input of the amplifier 22 and functioning as bilateral switches effective to short circuit the condensers and the input in response to operation of the lead selector switch 14.

More specifically, each of the emitter electrodes 34 and 36 of the transistors 30 and 32 are connected to one point of interconnection between one of the coupling condensers 18 and 20 and one side of the input of the amplifier 22. Collector electrodes 38 and 40 are connected to a point of reference potential, i.e., ground. The transistors 30 and 32 additionally include base electrodes 42 and 44 by means of which the conductivity of the transistors 30 and 32 is controlled in accordance with the operation of the switch 14.

Each of the transistors 30 and 32 is normally held in a nonconductive or open circuit condition by a control signal coupled to the base electrodes 42 and 44 through the switch section 14*e*, through an additional transistor 46 and through a pair of base resistors 48 and 50. More specifically, the transistor 46 includes a base electrode 52 connected to ground through a resistor 54 and to the movable contact or wiper contact of the switch section 14*e*. Each of the fixed contacts of the switch 14*e* is connected to a terminal 56 connected to a relatively positive source of DC potential. Thus in each position of the operating switch 14, a positive potential is applied to the base electrode 52 of the transistor 46 through the movable contact and one fixed contact of the switch section 14*e*.

The transistor 46 includes an emitter electrode 58 connected to a terminal 60 to which is applied a relatively positive DC potential, and a collector electrode 62 connected to ground through a resistor 64. Thus in each position of the lead selector switch 14, the transistor 46 is held in a nonconductive condition because a positive voltage is applied to both the base electrode 52 and the emitter electrode 60. As a result, the base electrodes 42 and 44 of the transistors 30 and 32 are maintained substantially at ground potential through the resistor 64 and resistors 48 and 50. In this manner the transistors 30 and 32 are normally maintained in a nonconductive, or open circuit condition.

In accordance with a feature of the invention, the control signal for the operation of the transistors 30 and 32 is interrupted whenever the lead selector switch 14 is moved between positions. Interruption of the control signal renders the transistors 30 and 32 conductive for a period of time, during which time they function substantially as closed circuits shorting the coupling capacitors 18 and 20 and the input of the amplifier 22 to ground.

Having reference now to FIG. 2 of the drawing, portions of switch sections 14*d* and 14*e* of the lead selector switch are shown in diagrammatic form. In FIG. 2, adjacent fixed contacts of the switch section 14*d* are designated as 70 and 72, while the wiper contact of this switch section is designated as 74. Adjacent fixed contacts of switch section 14*e* are designated as 76 and 78 and the corresponding wiper contact is designated as 80. The switch sections 14*a*, 14*b* and 14*c* are not shown in FIG. 2, and may be identical to switch section 14*d*.

In FIG. 2 the movable contacts 74 and 80 are illustrated in movement from fixed contacts 70 and 76 to fixed contacts 72 and 78 during operation of the lead selector switch 14. Wiper contact 80 is non-shorting in that it breaks contact with fixed contact 76 before it makes contact with fixed contact 78. Conversely, wiper contact 74 of switch section 14*d* is a shorting contact as it makes contact with fixed contact 72 before breaking contact with fixed contact 70.

When the lead selector switch 14 is operated to change the input connections to the preamplifier 16 and the amplifier 22, the wiper contact of switch section 14*e* breaks contact with its fixed contact before any switching function is begun by the switch sections 14*a*, 14*b* 14*c* and 14*d*. As a result, the interconnection between the terminal 56 and base electrode 52 is severed. The transistor 46 is placed in a conductive condition by the voltage differential applied between the emitter electrode 58 and the base electrode 52 coupled to ground through resistor 54. Base electrodes 42 and 44 of transistors 30 and 32 are coupled to the relatively positive terminal 60 through the transistor 46 and resistors 48 and 50. Accordingly the transistors 30 and 32 are placed in a conductive condition, each grounding one side of the input of amplifier 22 and one of the coupling capacitors 18 and 20.

As the lead selector switch 14 continues to move, the wiper contacts of sections 14*a*, 14*b*, 14*c* and 14*d* short across adjacent fixed contacts. This arrangement, although not necessary, prevents the inputs to the preamplifier from being open circuited at any time.

Upon continued movement, the wiper contacts of switch sections 14*a*, 14*b*, 14*c* and 14*d* break contact with the initially engaged fixed contacts. During and following operation of the lead selector switch 14, the coupling capacitors 18 and 20 reach a new steady-state charge condition, and this process is greatly speeded by the low resistance path through the conductive transistors 30 and 32.

As the lead selector switch 14 reaches its final position, the wiper contact of switch section 14*e* engages the corresponding fixed contact, reestablishing a connection between terminal 56 and base electrode 52, thereby returning the transistor 46 to its nonconductive condition. In order to assure that the transistors 30 and 32 remain conductive for the duration of any undesirable transients, and to allow the coupling capacitors 18 and 20 sufficient time to reach a steady-state condition, a time delay circuit including a capacitor 72 and a resistor 74 is coupled to ground and to the base electrodes 42 and 44 of transistors 30 and 32. When the transistor 46 is placed in a conductive condition during switching, the capacitor 72 becomes charged and maintains a positive potential on the base electrodes 42 and 44 for a period of time after the transistor 46 is returned to its normal, nonconductive condition. The extent of the time delay is determined by the values of the capacitor 72 and the resistors 74 and 64. For example, this time delay can be on the order of one-fifth of a second.

The operation of the novel cardiac amplifier system 10 will be apparent to those skilled in the art from the above detailed description. Briefly reviewing this operation, assume that the lead selector switch 14 is in its illustrated position. In this position a so-called "augmented" connection is made, and one input of the preamplifier 16 is coupled to the right arm electrode 12 through the switch section 14*c*. The other input to the preamplifier 16 is coupled in common to the left leg and left arm electrodes 12 through the switch sections 14*b* and 14*d*. Cardiac signals supplied from these electrodes are preamplified, and coupled through the coupling condensers 18 and 20 to the amplifier 22.

When the lead selector switch is moved, for example one step in a clockwise direction from the illustrated position, a simple connection is made in which one side of the preamplifier 16 is connected to the left leg electrode 12 and the other side is connected to the left arm electrode 12. The quiescent or steady-state voltages appearing across the coupling condensers 18 and 20 will very likely be different in these two positions due to the differing skin potentials encountered by the electrodes.

When the switch is moved from one position to another, the control signal holding the transistors 30 and 32 in a non-conductive condition is interrupted, rendering these transistors conductive to short the coupling condensers 18 and 20 and the input to the amplifier 22. During the time that these transistors are conductive, the input connections are changed by the switch sections 14*a*, 14*b*, 14*c* and 14*d*. Thus the condensers 18 and 20 are discharged and undesirable transients are prevented from being applied to the input of amplifier 22.

The time delay circuit including the capacitor 72 holds the transistors 30 and 32 in a conductive condition for a period of time. During this period of time, the coupling condensers 18 and 20 are allowed to reach the new quiescent voltage condition determined by the new position of the lead selector switch 14. Subsequently, the transistors 30 and 32 are returned to a conductive condition and the cardiac amplifier system 10 is immediately able to produce an accurate output signal corresponding to the cardiac signal selected by the input selector switch 14.

While the present invention has been described in connection with a particular embodiment thereof, various other modifications and embodiments may be devised by those skilled in the art. The present invention is not limited to details of the described embodiment, except insofar as set forth in the appended claims.

What is claimed as new and desired to be secured by Letters Patent of the United States is:

1. A cardiac amplifier switching system comprising:
a plurality of input leads;
a push-pull amplifier having an input;
a pair of coupling condensers connected to said input for introducing cardiac signals to said amplifier;
a lead selector switch including a plurality of first switching devices coupled between said input leads and said coupling condensers for changing the input connections to said amplifier;
a second switching device;
each of said first and second switching devices including a plurality of fixed contacts and a movable wiper contact engageable in sequence with said fixed contacts;
a single manual operator common to all of said first and second switching devices and movable between a plurality of operating positions in which all of said wiper contacts engage selected fixed contacts;
short circuiting means connected to said coupling condensers and to the input of said amplifier stage;
said short circuiting means comprising a pair of transistors each having a first output electrode connected to one of said coupling condensers, a second output electrode connected to a point of reference potential, and a control electrode;
a signal source providing a control signal for maintaining said transistors in a non-conductive condition;
a circuit means coupling said control signal through said fixed contacts and said wiper contact of said second switching device in each operating position of said manual operator for applying said control signal to said transistor control electrodes and rendering said short circuiting means non-conductive;
said wiper contacts of said first switching devices being engageable in make-before-break sequence with their corresponding fixed contacts;
and said wiper contact of said second switching device engaging its corresponding fixed contacts in break-before-make sequence for interrupting the control signal upon operation of said selector switch to render said short circuiting means conductive.

2. The system of claim 1, further comprising a timing circuit including resistive and capacitive elements associated with said circuit means for maintaining said transistors conductive for interval of time after operation of said selector switch.

References Cited

UNITED STATES PATENTS

| | | | |
|---|---|---|---|
| 2,865,366 | 12/1958 | Partridge | 128—2.06 |
| 3,199,508 | 8/1965 | Roth | 128—2.06 |

WILLIAM E. KAMM, Primary Examiner